Patented May 23, 1950

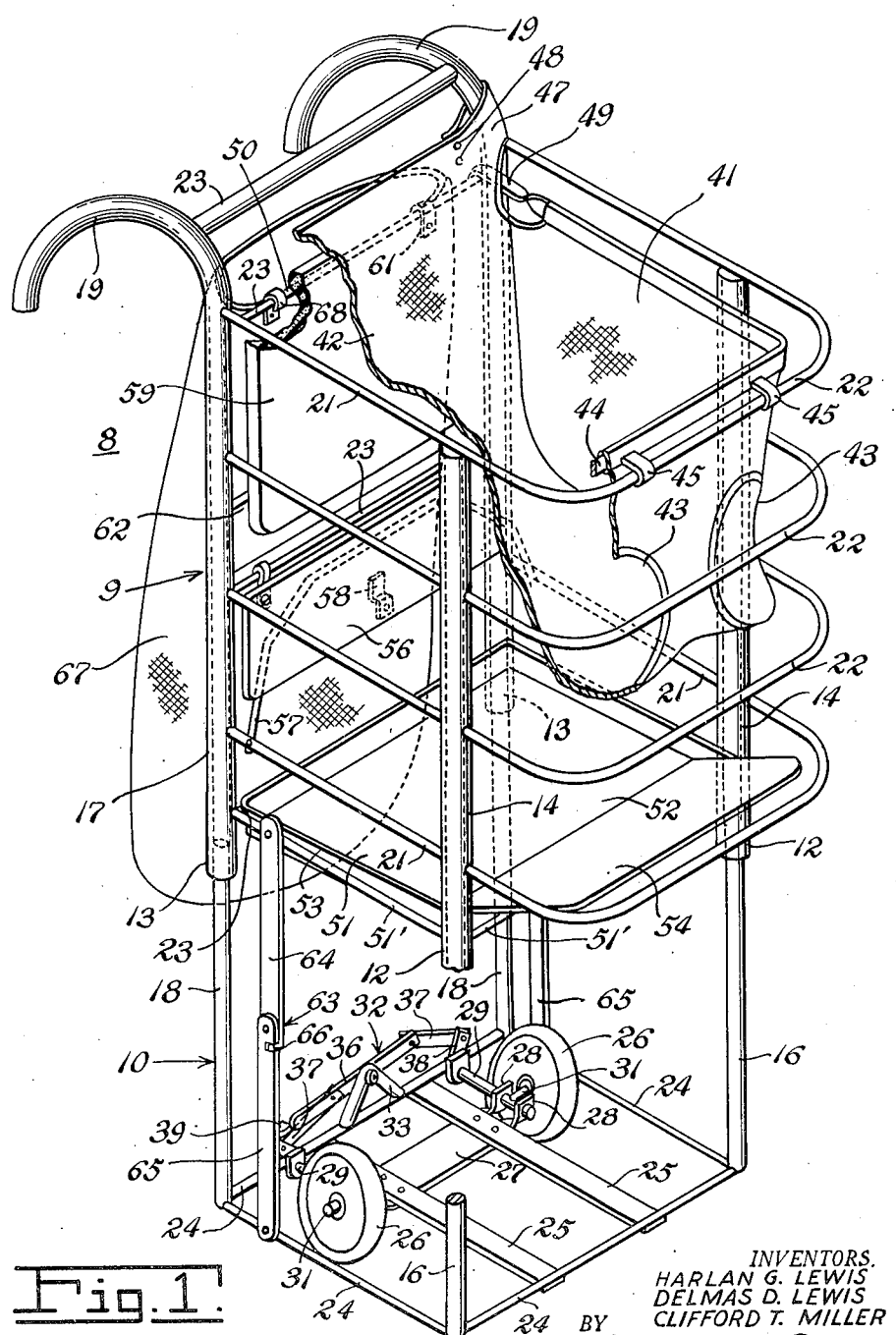

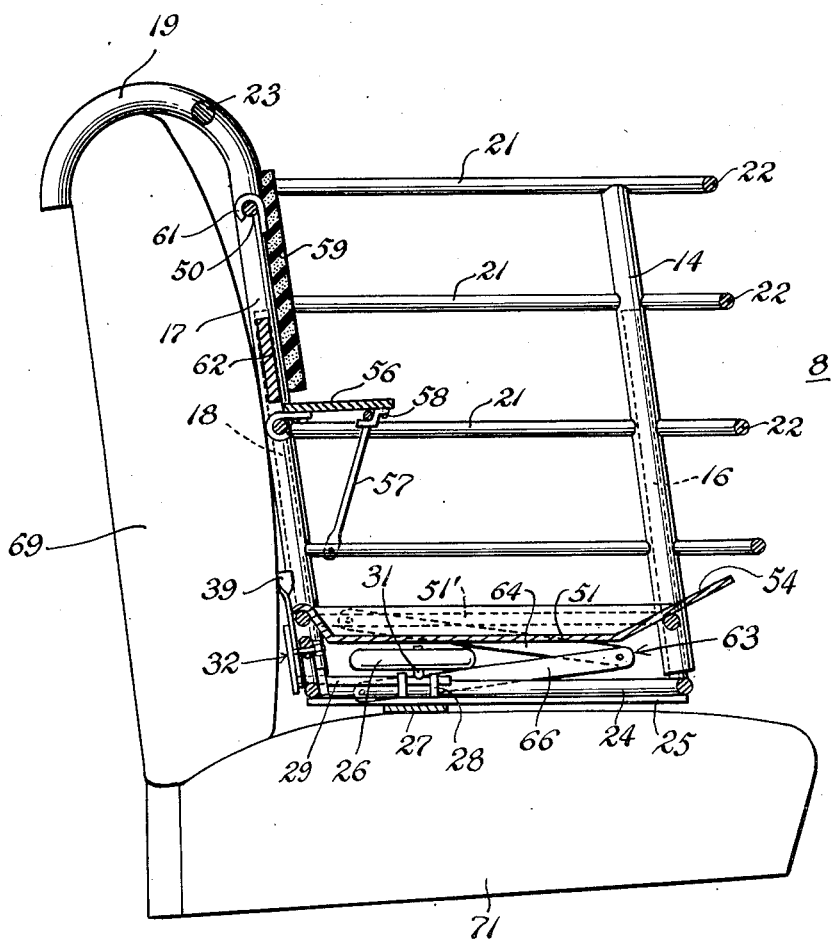

2,509,103

UNITED STATES PATENT OFFICE 2,509,103

INFANT'S CONVEYANCE

Harlan G. Lewis, Columbus, Delmas D. Lewis, Hamilton, and Clifford T. Miller, Harrison, Ohio Application October 6, 1948, Serial No. 53,044

4 Claims. (Cl. 280—36)

This invention relates to an infant's conveyance and more particularly relates to a wheeled infant's conveyance which can be readily adapted for carrying in a vehicle.

An object of this invention is to provide an infant's conveyance suitable both for carrying an infant in a vehicle and for wheeling the infant along a sidewalk or the like.

A further object of this invention is to provide a collapsible infant's conveyance of this type which can readily fit in a vehicle.

A further object of this invention is to provide a collapsible infant's conveyance which can be attached to the back of a vehicle seat.

A further object of this invention is to provide an infant's conveyance suitable for holding an infant both while being transported in a vehicle and while being wheeled.

A further object of this invention is to provide a collapsible wheeled infant's conveyance having a means for supporting a shopping bag or the like.

A further object of this invention is to provide an infant's conveyance adaptable for use by infants of various sizes.

The above and other objects are attained by the means described herein and disclosed in the accompanying drawings, in which:

Figure 1 is a perspective view showing an infant's conveyance constructed in accordance with an embodiment of this invention, a canvas infant's seat or support being shown partly broken away and in section; and Fig. 2 is a side elevational view of an automobile seat and the infant's conveyance shown in Figure 1 in collapsed form, the conveyance being shown attached to the seat of the automobile, the conveyance being shown partly broken away and in section.

Briefly, this invention provides an infant's conveyance having a collapsible framework. Wheels are attached to a lower section of the framework for wheeling the conveyance. An infant's seat is built into an upper section of the framework. Handle members form a part of the framework. The sections of the device are telescopically extensible between an extended or elongated position in which the conveyance can be wheeled and a contracted or shortened position so that the device can be placed on an automobile seat with the handles hung over the back of the seat. The conveyance may be used to hold an infant whether in contracted or extended position. The wheels may be mounted on swinging axles so that the wheels may be swung into the framework when the conveyance is collapsed, and the wheels need not come in contact with the seat. If desired a shopping bag or the like may be hung on the framework, and the device may be used not only for wheeling an infant but also for carrying purchases.

In the drawings an infant's conveyance constructed in accordance with this invention is indicated generally at 8. The conveyance includes an upper section 9 and a lower section 10 which sections can telescope together. A framework of the conveyance includes forward and rear pairs of telescopic vertical members indicated at 12 and 13 respectively. Each of the forward telescopic members includes a sleeve 14 in which a rod 16 can slide lengthwise. Similarly, each of the rear telescopic members 13 includes a sleeve 17 and a rod 18 which can slide telescopically within sleeve 17. Upper ends of sleeves 17 are bent rearwardly to form handle members 19.

The sleeves 14 and 17 are held together by a series of U-shaped frame rods 21 welded or otherwise firmly fixed to the sleeves. At a forward side of the conveyance, rods 21 are bowed forwardly, as shown at 22, and link opposite sleeves 17. Short cross rods 23 link rear sleeves 17. Sleeves 14 and 17 and rods 21 and 23 form the upper section 9 as a unitary enclosure slidable lengthwise of rods 16 and 18.

Lower ends of rods 16 and 18 are linked by frame rods 24 to form the lower section 10. A pair of parallel bars 25 extend between front and rear rods 24 to form a support for wheels 26. A transverse flat bar 27 is firmly fixed to the bars 25, and opposite ends of the transverse bar 27 are bent upwardly, as shown, to form ears 28. Ears 28 are bored to receive rotatable axle supporting pins 29. An axle 31 of each wheel 26 is attached, as by welding, to one of the pins 29, and each axle and wheel may be swung by the pin to raise the wheels 26 into the framework, as shown in Figure 2, when the wheels are not in use.

As shown in Fig. 1 a linkage 32 is provided for turning the pins and wheels into or out of the framework. The linkage 32 is supported by a V-shaped support 33 attached to the rear frame rod 24. A pivoted bar 36 is carried by support 33 and can swing about its pivot to move links 37 and crank arms 38 rigidly secured to pins 29 and turn the pins. Links 37 join crank arms 38 and pivot bar 36 so that as the latter is turned links 38 turn the crank arms and pins 29. At one end of the pivot bar 36 is located a finger grip 39 for use in turning the pivot bar. When the grip 39 is raised to the position shown in Fig. 2, the wheels are swung into the framework and out of the way. On the other hand, when the grip 39 is lowered to the position shown in Fig. 1 the wheels are lowered to support the conveyance.

A bucket-type child's seat 41 can be carried in the enclosure 9. The seat 41 may be made of canvas or other appropriate material and includes a backing member 42 of seat shape. Openings 43 in the front of the backing member can receive a child's legs. The seat 41 is open at the top, and a reinforcing member 44 embraces three sides of the seat. Clips 45 attached to member 44 may rest on a forward part 22 of uppermost frame rod 21. The fourth side of backing member 42 is equipped with backwardly extending strip portions 47 which can be turned about the handle members 19 for further support of the seat. Snap fasteners 48 may hold the strip portions 47 in place about the handle members. Ends 49 of the member 44 extend rearwardly and are turned to fit over an upper rear frame rod 50 for supporting sides of the seat.

As will be understood the seat 41 is demountable and may be removed when not required. The conveyance is further adaptable for use by an infant or child who has outgrown the canvas seat 41. A floor member 51 fits on lower rods 51' of the framework and may serve to support a child after removal of the seat member 41. The floor member 51 includes a lower panel 52. A shallow rim 53 may extend around three sides of panel 52, and on a fourth side, an upwardly sloping lip 54 extends forwardly to rest on forward part 22 of lowermost frame rod 21. The floor member may be lifted free of the framework for cleaning or the like. The floor member 51 serves not only as a platform for supporting an older child but also may be used in conjunction with the seat 41 for catching anything which may be dropped by the child or as a platform for supporting articles of various types beneath the child, and the rim serves to prevent the child's feet slipping off the platform.

A collapsible seat may be provided also for use of the older child. The seat is made up of a flat panel 56 rotatably mounted on a rear rod 23. A supporting bracket 57 is rotatably mounted on the framework as shown below the seat panel. The bracket 57 can swing into position behind panel 56, and both panel 56 and bracket 57 may be aligned with the rear frame members 13 when not in use. A clip 58 is attached to a lower surface of panel 56, and as shown in Figure 2 the bracket 57 is held in the clip 58 when the seat is raised.

A back 59 is mounted above the seat, and may comprise a pad of rubber or other similar resilient material. As shown, the back 59 is supported by clips 61 which can hang on frame rod 50. The lower portion of the back 59 may swing against a transverse frame member 62 joined to opposite rear sleeves 17.

The sections of the conveyance may be locked in extended position by toggle linkages 63, only one of which is fully shown. Each toggle linkage includes an upper member 64 pivoted to one of the rods 51' and a lower member 65 pivoted to a rod 24. When the conveyance is extended, the members 64 and 65 are aligned. When the members are aligned, catches 66 bind to hold the framework of the conveyance in extended position.

A shopping bag 67 may be hung to the framework as shown in Figure 1. The bag may be of conventional size and shape and is equipped with clips 68 which can fit over the frame rod 50 for supporting the shopping bag.

When the conveyance is in extended position, as shown in Fig. 1, the conveyance may be wheeled to carry an infant therein. On the other hand, when the conveyance is collapsed, as shown in Figure 2, the conveyance can be attached to a vehicle seat. In Figure 2 a back of an automobile seat is indicated at 69 and a seat or lower portion is indicated at 71. The wheels 26 are swung into the lower framework, and bar 27 can rest on seat 71 when the conveyance is collapsed. The handle members 19 can fit over the back 69, and the conveyance may be used in the manner of a conventional car seat.

The device is particularly convenient because it can be used not only for wheeling a child but also as a car seat. In collapsed position the conveyance can readily be placed in a vehicle and occupies no more room than a conventional car seat.

The framework of the conveyance may be made of any suitable metal. Various changes and modifications in the structure of the device will be apparent, and the invention is not intended to be limited by the foregoing detailed description and the drawings but only as set forth in the appended claims.

What is claimed is:

1. In an infant's conveyance, the combination of a plurality of frame members each of said frame members being formed of telescoping sections, connecting members joining adjacent frame members to form a hollow framework, a platform mounted on said framework and spaced below the upper end thereof, said platform and said hollow framework forming an enclosure, said platform forming a floor for said enclosure, a seat member mounted on said framework for extension into said enclosure in spaced relation above the platform, handle members attached to an upper end of said framework, said handle members being adapted to fit over a back of a vehicle seat, and wheels attached to a lower end of said framework, said framework being telescopable lengthwise between an extended position for wheeling of the conveyance and a retracted position for attaching to the vehicle seat.

2. An infant's conveyance which comprises an enclosed framework, handle members attached to said framework, said handle members being adapted to fit over a back of a vehicle seat, an infant's bucket-type seat, means for removably supporting said infant's seat on said framework, a platform mounted on said framework below said supporting means, said platform forming a floor for said enclosed framework, wheels attached to a lower end of said framework, said framework being telescopable lengthwise between an extended position for wheeling of the conveyance and a contracted position for attaching to the vehicle seat, and axles for said wheels, said axles being provided with a movable support whereby the wheels may be swung into the framework.

3. In an infant's conveyance, the combination of a plurality of frame members, each of said frame members being formed of telescoping sections, connecting members joining adjacent frame members to form a hollow framework, a platform mounted on said framework and spaced below the upper end thereof, said platform and said hollow framework forming an enclosure, said platform forming a floor for said enclosure, handle members attached to an upper end of said framework, said handle members being adapted to fit over a back of a vehicle seat, wheel axles attached to a lower end of said framework, wheels on said wheel axles, said axles being adjustable to move the wheels between a lowered position in which the wheels are adapted to support the conveyance and a raised position in which the wheels are above a lower side of the framework, and means for adjusting the axles to move the wheels between raised and lowered position, said framework being telescopicable lengthwise between an extended position for wheeling the conveyance and a retracted position for attaching to the vehicle seat.

4. In an infant's conveyance, the combination of a plurality of frame members, each of said frame members being formed of telescoping sections, connecting members joining adjacent frame members to form a hollow framework, a platform mounted on said framework and spaced below the upper end thereof, said platform and said hollow framework forming an enclosure, said platform forming a floor for said enclosure, handle members attached to an upper end of said framework, said handle members being adapted to fit over a back of a vehicle seat, wheel axles pivotally attached to the lower end of said frame, and wheels on said axles, the axles and wheels being adapted to swing between a lowered position in which the wheels are adapted to support the framework and a raised position in which the wheels and axles are inside the framework, said framework being telescopicable lengthwise between an extended position for wheeling of the conveyance and a retracted position for attaching to the vehicle seat.

HARLAN GARD LEWIS.
DELMAS D. LEWIS.
CLIFFORD T. MILLER.

REFERENCES CITED

The following references are of record in the file of this patent:

UNITED STATES PATENTS

| Number | Name | Date |
|---|---|---|
| 255,991 | Hoopes | Apr. 4, 1882 |
| 1,190,399 | Gates | July 11, 1916 |
| 1,981,285 | Rechlicz | Nov. 20, 1934 |
| 2,264,121 | Pattiani | Nov. 25, 1941 |
| 2,435,733 | Belyeu | Feb. 10, 1948 |
| 2,449,618 | Pritchard | Sept. 21, 1948 |